Figure 1:
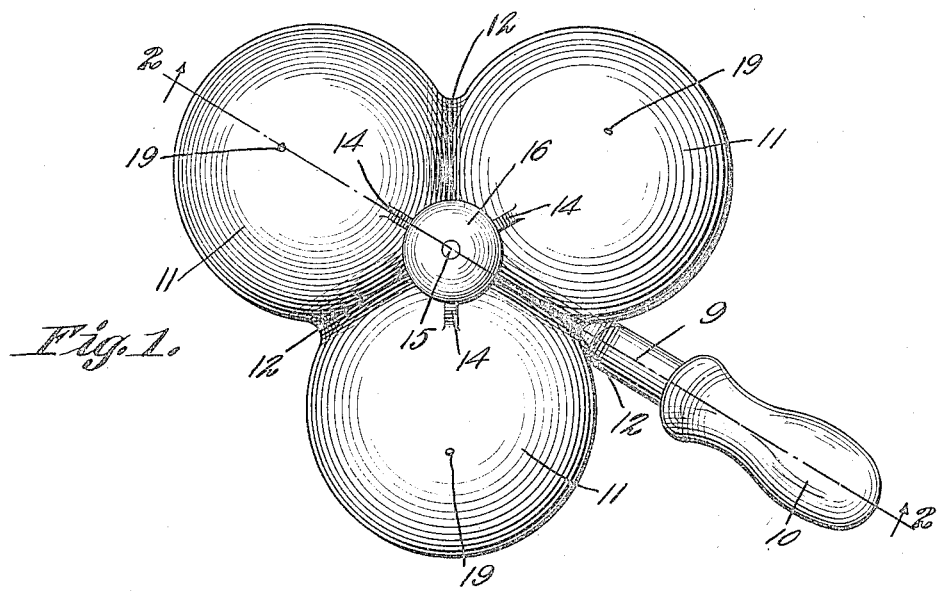

H. C. JENSEN.
EGG COOKER.
APPLICATION FILED OCT. 18, 1921.

1,433,824. Patented Oct. 31, 1922.

H. C. Jensen, Inventor.

By [signature], Attorneys.

Patented Oct. 31, 1922.

1,433,824

UNITED STATES PATENT OFFICE.

HOWARD CHRISTIAN JENSEN, OF EUREKA, CALIFORNIA.

EGG COOKER.

Application filed October 18, 1921. Serial No. 508,441.

*To all whom it may concern:*

Be it known that I, HOWARD C. JENSEN, a citizen of the United States, residing at Eureka, in the county of Humboldt and State of California, have invented a new and useful Egg Cooker, of which the following is a specification.

This invention aims to provide a simple means whereby one or more eggs may be cooked with a minimum amount of water, novel means being provided for holding the eggs in place, a proper circulation of steam being afforded, and novel means being provided for handling the parts of the device.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the drawings:—

Figure 2:
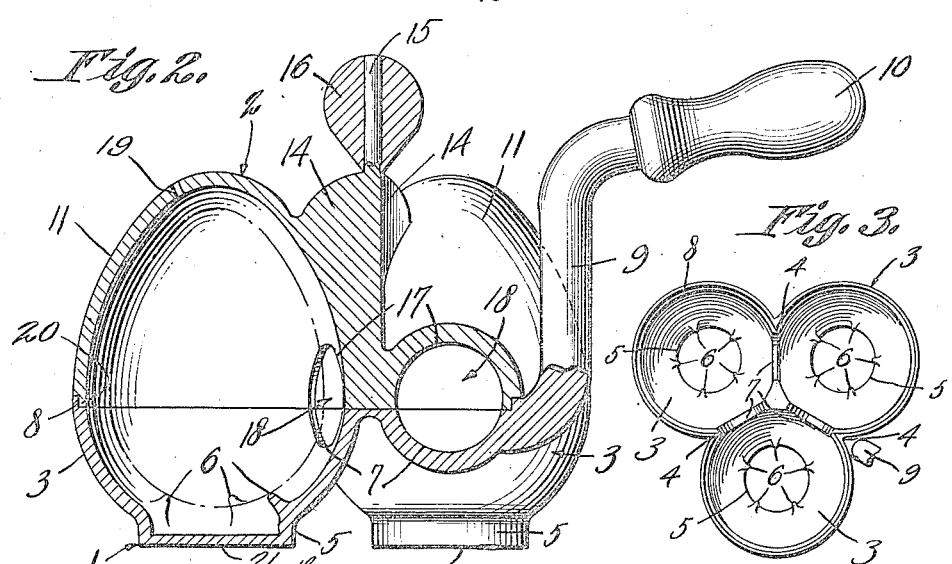
Figure 3:
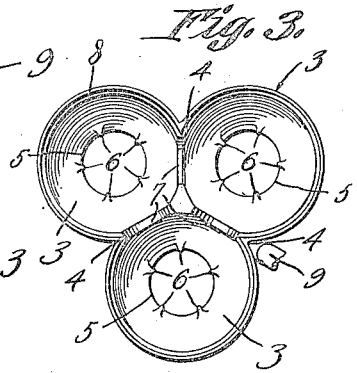
Figure 4:
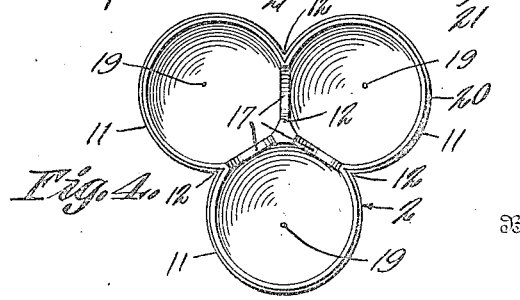

Figure 1 shows in top plan, a device constructed in accordance with the invention; Figure 2 is a side elevation wherein parts are broken away; Figure 3 is a top plan of the base; Figure 4 is a bottom plan of the top or lid.

The device forming the subject matter of this application preferably is made of metal and includes a base 1 and a lid 2 resting on the base 1.

The base 1 embodies any desired number of cup-shaped receptacles 3, the walls of which are joined radially with respect to a central vertical axis, as shown at 4. Each receptacle 3 has a reduced cylindrical bottom portion 5 adapted to serve as a water container. In each receptacle 3 there is a plurality of inwardly extended upwardly inclined projections 6 located slightly above the cylindrical bottom portion 5. In those portions of the walls which are joined as at 4, there are notches 7. The base 1 has a circumferential flange 8. An L-shaped upwardly extended handle 9 projects from the base 1 and, preferably, is located at the point of juncture between two of the receptacles 3. The handle 9 terminates in a grip 10, made of wood, fibre, or some other like material which will not conduct readily.

The outline of the lid 2 follows the outline of the base 1, the lid including a plurality of inverted cup-shaped members 11, the walls of which are joined radially with respect to a central vertical axis, as shown at 12. The upper portions of the cup-shaped members 11 are joined externally, by reduced fins 14 carrying a stem 15, the stem being supplied with a grip 16 which is made of some material which will not conduct readily. Notches 17 are formed in the joined portions 12 of the walls of the members 11, the notches 17 matching with the notches 7 in the base 1 to form openings 18 which permit a circulation of steam. Each member 11 of the lid 2 preferably is provided in its upper portion with a minute vent 19. The lid 2 has a circumferential flange 20 received within the flange 8 of the base 1 and serving to hold the lid 2 in place on the base 1.

In practical operation, a small quantity of water is placed in each of the reduced bottom portions 5 of the receptacles 3. The eggs are supported on the projections 6, and the lid 2 is mounted in place on the base 1. If the device be placed upon a stove, or be heated otherwise, the water in the reduced portions 5 will be converted rapidly into steam and will circulate through the openings 18, the eggs being cooked in a very short period of time, and with a minimum amount of water. The lid 2 may be removed, if desired, and the eggs may be served in the base 1, the handle 9, of course, constituting a convenient means for manipulating the base.

Since the lid 2 is provided with the vents 19, it will be impossible for such a pressure of steam to be created that the lid 2 will be blown off or displaced. Because the stem 15 is carried by the thinned reduced fins 14, a minimum amount of heat will be conducted to the stem 15, and the lid 2 may be handled readily, due to this fact, and due to the further fact that the grip 15 is made of material which will not conduct heat readily.

It is to be observed that the reduced bottom portions 5 of the receptacles 3 have flat lower surfaces 21. Since these flat surfaces 21 are provided, a relatively large area is brought into contact with the stove or other heating medium, and, thus, the water in the bottom portions 5 of the receptacles 3 will be heated rapidly.

What is claimed is:—

1. A device for cooking eggs, comprising a cup-shaped receptacle, and a cup-shaped lid resting thereon, the receptacle being provided at its lower end with a reduced bottom portion constituting a water container, the receptacle being supplied in its interior with projections, located closely adjacent to the reduced bottom portion and forming egg supports.

2. In a device of the class described, a plurality of receptacles disposed symmetrically with respect to a central axis and having common walls, the walls having notches constituting steam passages leading from one receptacle to another; and a lid mounted on the receptacles.

3. A device of the class described comprising receptacles disposed about a central axis and having common walls; and a lid resting on the receptacles and having common walls, the walls of the lid and the walls of the receptacles having cooperating notches defining steam passages.

4. A device of the class described comprising a plurality of cup-shaped receptacles grouped about a central axis and having common walls; a lid comprising a plurality of inverted cup-shaped members cooperating with the receptacles; fins connecting the cup-shaped members; and a grip carried by the fins.

In testimony that I claim the foregoing as my own, I have hereto affixed my signature in the presence of two witnesses.

HOWARD CHRISTIAN JENSEN.

Witnesses:
ALONZO J. MONROE,
LUCRETIA A. MONROE.